United States Patent Office 3,206,352
Patented Sept. 14, 1965

3,206,352
POLYMERIC POLYISOCYANURATE LAMINATING RESIN PREPARED FROM A DIARYL DIISOCYANATE AND A COCATALYST SYSTEM
Morton H. Gollis, Brookline, and Lucius G. Gilman, Wakefield, Mass., assignors to Monsanto Research Corporation, St. Louis, Mo., a corporation of Delaware
No Drawing. Filed Mar. 23, 1962, Ser. No. 182,109
10 Claims. (Cl. 161—93)

This invention relates to an aryl substituted polyisocyanurate and also to the method of producing the same, and more particularly it pertains to a polyisocyanurate which possesses exceptional characteristics for use as a laminating resin.

This application is a continuation-in-part of our co-pending application Ser. No. 845,658, filed October 12, 1959, now abandoned.

Under suitable reaction conditions aromatic diisocyanates were made to polymerize into solid products. The conditions employed for the reaction involved the use of an ionic polymerization catalyst at temperatures of up to 125° C. Contrary to expectations it was found that the aromatic diisocyanates were not equivalent in their ability to produce satisfactory resins for lamniating purposes. In this connection, based on previous knowledge of diisocyanates, one skilled in the art would have supposed that a mono-nuclear aromatic type such as toluene diisocyanate would give the best results. For reasons not clearly understood it turns out that such a diisocyanate yields brittle polymeric products which are ill suited for the purpose. Projecting this finding would have led to the conclusion that all aromatic diisocyanates are equally ineffective, but quite unexpectedly, it was discovered that certain types of aromatic diisocyanates, which form the basis of the present invention, yield laminating resins having excellent toughness and high temperature stability.

Accordingly, an object of the present invention is to provide a novel polymeric product which is especially suited as a laminating resin.

Another object is to provide a novel method of producing the aforesaid polymeric product.

Other objects and advantages of the present invention will become apparent from the following description and explanation thereof.

In accordance with the present invention, a diaryl diisocyanate of the type contemplated hereunder is polymerized to a polyisocyanurate in the presence of a catalyst for ionic polymerization or an ionic polymerization catalyst. The repeating structure of the resulting polyisocyanurate polymer may be represented as follows, which for the purpose of the present specification and the appended claims is designated as the trifunctional isocyanurate ring containing the divalent radicals A as defined hereinbelow:

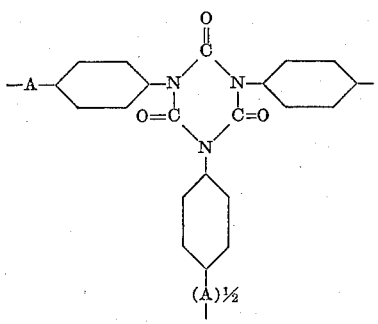

wherein A may be an alkylene group, e.g., methylene, trimethylene, etc.; alkenylene, e.g., propenylene, alkynylene; —CH$_2$—Z—CH$_2$— wherein Z is a cyclic group, e.g., of the hydrocarbon type, such as alicyclic or aryl; sulfur; oxygen; sulfone, silyl; and the like. There may be at least about 10 of the above repeating units in the product.

The polymeric product of this invention is infusible and insoluble in organic or inorganic solvents. These properties serve to indicate that the polymer is cross-linked because generally linear polymers are characterized by being fusible and soluble in organic or else inorganic solvents. Since the monomeric material is bifunctional, the cross-linked character of the polymer is satisfactorily explained by the structure of the repeating unit given hereinabove. The cyclic structure of the repeating unit provides a tri-functional material, which can cross-link in a fashion typical of other similarly cross-linked materials.

The polymeric product of this invention is prepared from a diaryl diisocyanate having an aliphatic group intermediate of the aryl groups. The starting material may be represented by the following structural formula:

II

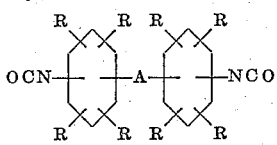

wherein R may be hydrogen or not more than about two R groups for each phenyl group may be alkyl, nitro, nitroso, halogen, cyano, etc., and A may be an alkylene groups such as methylene or trimethylene; alkenylene; alkylene sulfur; oxygen; sulfone; silyl; —CH$_2$—Z—CH$_2$— wherein Z may be a cyclic group, e.g., of the hydrocarbon group such as alicyclic or aryl, etc. Specific examples of monomers are 4,4-diphenylmethane diisocyanate; 4,4'-diisocyanatodiphenyl disulfide; 4,4'-azobenzene diisocyanate; 4-isocyanatophenyl ester of 4-isocyanatophenyl-sulfonic acid; 4,4'-benzophenone diisocyanate; 4,4'-diisocyanatodiphenylether; 1,2-bis(4-isocyanatophenoxy)ethane; 1,2 - bis(4 - isocyanatobenzenesulfonamido)ethane; 4,4'-stilbene diisocyanate; 2,2-bis(4-isocyanatophenyl) propane; 4.4' - diisocyanatodiphenylsulfone; beta,beta'-bis(4 - isocyanatophenoxy)diethylether; cyclohexylbis-(4-isocyanatophenyl)methane; 4 - nitrophenyl bis(4-isocyanato-phenyl)methane; 2,2'-dimethyl-4,4'-diisocyanatodiphenyldisulfide etc.

The polymerization reaction of the present invention is catalyzed by means of a catalyst for ionic polymerization or ionic polymerization catalyst including a strong base, which may be organic or inorganic and does not affect adversely to any significant extent the product materials. The strong bases include, for example, tertiary amines, e.g., triethylamine, pyridine, 1,4-diazabicyclo-[2.2.2]octane, etc.; alkali or alkaline earth metal salts of low molecular weight carboxylic acids such as those containing about 1 to 3 carbon atoms, e.g., sodium carbonate, sodium acetate, potassium acetate, etc.; alkali metal alkoxides, e.g., sodium methoxide, potassium propoxide, etc.; organic tertiary phosphines, e.g., triethyl phosphine, dimethylphenyl phosphine, etc. From the compounds enumerated above, it will be readily apparent to those skilled in the art that the catalyst generically is one which induces ionic polymerization. The quantity of catalyst employed for the reaction may vary over wide limits, but in general about 0.1 mole percent to 50 mole percent based on monomer starting material may be employed. Preferably about 0.1–5 mole percent of a relatively stronger base catalyst such as the above bicyclo compound or preferably about 20–50 mole percent of a relatively weaker base catalyst such as triethylamine, based on the monomer starting material, may be employed.

The catalysis of the polymerization reaction may be enhanced by the additional use of an organic epoxide. The organic epoxide is miscible with the diisocyanate monomer. The epoxide includes the aromatic and aliphatic types such as, for example, epihalohydrins, e.g., epichlorohydrin, etc.; alkylene oxides, e.g., propylene oxide, styrene oxide, etc.; alkenyl oxide, e.g., butadiene oxide, etc.; glycidyl esters, e.g., ethyl glycidate, etc. Generally, the presence of the epoxy group is required in order to enhance catalysis, and the compound containing the same is wholly or partly miscible or soluble with the monomer. The amount of organic epoxide employed with the ionic polymerization catalyst may vary considerably, but in general up to 100 mole percent, preferably about 0.1 to 10 mole percent when using a strong base catalyst or preferably about 20 to 50 mole percent when using a weak base catalyst, may be employed, based on the monomer starting material.

The polymerization reaction is conducted in liquid phase by either employing a temperature at which the materials are in that state, involving the same in bulk form, or by the use of a suitable solvent. By either method the polymerization temperature may vary from about ambient level to about 125° C., with the upper limit bein gdetermined by the fact that adverse effects tend to become noticeable above the same. However, in some instances temperatures above 125° C. may be used. After the polymerization at up to 125° C., the resin can be heated to more elevated temperatures into the range of 300–400° C., to drive off solvent and effect post-cure. While it is contemplated employing subatmospheric as well as superatmospheric pressures for the polymerization, the temperatures specified above relate to polymerization at atmospheric pressure. When the reactants are employed in bulk form, i.e., without a solvent, it is preferred to conduct the polymerization reaction at a temperature of about ambient level to 75° C., whereas with the use of solvent the temperature is preferably about 50° to 125° C. Optimum temperatures for polymerization are generally decreased as the amount of solvent is decreased and the conditions approach bulk polymerization. Using less solvent than monomer (on a weight basis), it has been found advantageous to use a temperature of about 50° C. until gelation, and subsequently raise the temperature to about 125° C. before discontinuing heating. The reaction time for the polymerization reaction may also vary considerably, but as a guide, it is noticed that the reaction in bulk form may take from about 5 minutes to 1 hour for substantial completion, whereas with a solvent, up to about 24 hours may be required. The reaction time can be shortened or lengthened to suit the particular needs of the situation, without departing from the scope of the invention.

The solvent for the polymerization reaction can be any one or more of those commonly employed for the purpose and with which the monomer and lower molecular weight reaction products are miscible and/or soluble. When an epoxide is also used in the polymerization reaction, it is miscible and/or soluble in the solvent. The solvent serves as a medium in which the reaction occurs or as a diluent for slowing down the reaction, and thus the quantity thereof can be varied over wide limits without departing from the scope hereof. Generally, about 0.1 to 20 parts, preferably about 8 to 10 parts by weight of solvent per part of monomer starting material are employed. Specific examples of solvents are dimethylformamide, dimethyl sulfoxide, 1,2-dichloroethane, trichloroethylene, etc.

The polyisocyanurate product of the present invention is an infusible solid which is insoluble in either organic or inorganic solvents. The polymer has excellent stability at elevated temperatures and possesses toughness rendering it especially adapted for use as a laminating resin. In this connection, the resin can be used to laminate sheets of glass fabric together. The fabric can be easily wetted by the monomer of the resin, the wetted sheets then placed together and the monomer given time to polymerize as desired. Alternatively, the uncoated sheets of glass fabric may be stacked in face to face contact with each other, soaked with the monomer and catalyst and then allowed to polymerize to give the laminated product. An important advantage in using the diisocyanate for lamination is that it can polymerize at atmospheric pressure during the lamination procedure. The laminated glass fabric can be employed for the manufacture of rocket motors and the like. Other applications for the resins are, for example, adhesives for joining metal to metal, wood to wood, paper to paper, or in joining dissimilar materials; potting compositions as for use in the construction of magnet coils or electronic assemblies; and wire insulation.

Having thus explained our invention, reference will now be had to specific examples for a fuller understanding thereof.

*Example 1*

One part of triethylamine was added to a solution containing five parts by weight of 4,4'-diphenylmethane diisocyanate and 2.5 parts by weight of styrene oxide dissolved in 40 parts by weight of N,N-dimethylformamide. The reaction was protected from atmospheric moisture and stirred at room temperature for one-half hour. At the end of this period the mixture was heated to 100° C., and after an additional one-half hour period, the viscosity of the mixture began to increase until gelation occurred in about 20 minutes. The resultant gel was powdered and then washed with ethyl ether in a Waring Blendor to yield 6 parts by weight of light tan solid powder.

*Example 2*

The same procedure as Example 1 was employed in this experiment except that different proportions of reactants were used and, also, after mixing the reactants, a temperature of 100° C. was employed immediately. The following proportions were used in the experiment. Five parts by weight diisocyanate, 2.4 parts by weight styrene oxide, 1 part by weight triethylamine, and 80 parts by weight N,N-dimethylformamide. Five parts by weight of solid polymeric product were obtained in this experiment.

*Example 3*

1.2 parts by weight of styrene oxide and 1 part by weight triethylamine were added to 5 parts by weight of molten 4,4'-diphenylmethane diisocyanate. Addition of triethylamine to the diisocyanate caused a vigorous exothermic reaction. Soon thereafter the mixture rapidly set to a solid mass.

*Example 4*

21 parts by weight of styrene oxide and 1 part by weight of 1,4-diazobicyclo[2.2.2]octane were added in turn to 89 parts by weight of molten 4,4'-diphenylmethane diisocyanate. Upon combining the materials, a vigorous exothermic effect occurred, and soon thereafter the mixture rapidly set to a solid mass.

*Example 5*

1 part by weight of triethylamine was added to a solution consisting of 17.4 parts by weight of toluene-2,4-diisocyanate, 2.4 parts by weight of styrene oxide in 200 parts by weight of N,N-dimethylformamide at room perature. The reaction mass was protected from atmospheric moisture and stirred at ambient temperature for a period of one hour. At the end of this period, the reaction mass was heated to 75° C. and held at that temperature for a period of two hours. The reaction mass was allowed to stand for a period of 16 hours at ambient temperature, and no observable increase in viscosity occurred. Thereafter, 2.4 parts by weight of styrene oxide and 1 part by weight of triethylamine were added to the reaction mass. The reaction mass was stirred at 85° C. for two and one-half hours and then followed by stirring at 100° C. After 55 minutes of stirring at 100° C., and eight-fold increase in viscosity was observed, followed by a rapid decrease in viscosity to the original value of the mixture in about 15 minutes. The reaction mass was then diluted with ethyl ether, causing precipitation of a gummy material that hardened to a tan solid. The yield of product was 22 parts by weight.

*Example 6*

2.1 parts by weight of styrene oxide and 1 part by weight of triethylamine were added in turn to 25 parts by weight of toluene-2,4-diisocyanate in a sealed tube. After 18 hours at room temperature, the reaction mass turned to a clear yellow solid. To insure complete reaction the tube was heated for an additional one-hour period at 100° C. The resultant product was a brittle, pale yellow solid.

The products of Examples 3 and 6 were compared from the standpoint of brittleness and toughness. It was found that the product of example 6 which was obtained from the polymerization of toluene 2,4-diisocyanate was substantially more brittle and significantly less tough in properties than the product from the polymerization of 4,4'-diphenyldimethanediisocyanate. It was clear from the comparison that product of Example 6 had no commercial potential as a laminating resin.

We claim:
1. A cross-linked solid polymeric product consisting of at least 10 repeating structural units

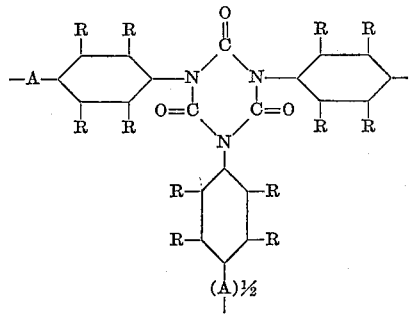

wherein A is selected from the group consisting of alkylene, alkenylene, alkynylene, sulfur, oxygen, sulfone, silyl and —$CH_2$—Z—$CH_2$— in which Z is a cyclic hydrocarbon group and R is selected from the group consisting of hydrogen, alkyl, nitro, nitroso, halogen and cyano, and not more than two of the R groups for each phenyl group are other than hydrogen.

2. A cross-linked solid polymeric product consisting of at least 10 repeating structural units

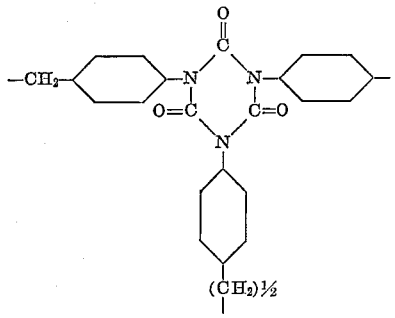

3. The method which comprises polymerizing a diaryl diisocyanate having the structural formula

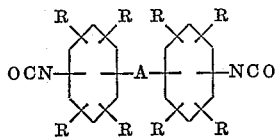

wherein A is selected from the group consisting of alkylene, alkenylene, alkynylene, sulfur, oxygen, sulfone, silyl, and —$CH_2$—Z—$CH_2$— in which Z is a cyclic group and R is selected from the group consisting of hydrogen, alkyl, nitro, nitroso, halogen, and cyano, and not more than two of the R groups for each phenyl group being other than hydrogen, with a basic catalyst of ionic polymerization and an organic vicinal epoxide until a solid polymer containing at least 10 polyisocyanurate ring units and having toughness and stability at elevated temperatures is obtained.

4. The method of claim 3 wherein the diisocyanate is 4,4'-diphenylmethane diisocyanate.

5. The process of claim 3 wherein the polymerization is conducted in a solvent for the diisocyanate.

6. A process which comprises polymerizing 4,4'-diphenylmethane diisocyanate with a basic catalyst of ionic polymerization and an organic vicinal epoxide at a temperature of about ambient level to about 125° C., and for a period such that a solid polymer containing at least 10 isocyanurate ring units and having toughness and thermal stability is obtained.

7. The process of claim 6 being further characterized such that the polymerization is conducted in a solvent selected from the group consisting of N,N-dimethylformamide, dimethylsulfoxide, 1,2-dichloroethane and trichloroethylene and at a temperature of about 50° to 125° C.

8. An article of manufacture comprising a plurality of sheets of glass fabric bonded together by means of the polymer of claim 1.

9. A method of bonding sheets of glass fabric together which comprises coating the surface of said materials with a diaryl diisocyanate having the structural formula

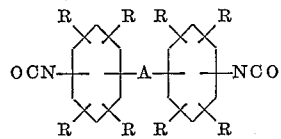

wherein A is selected from the group consisting of alkylene, alkenylene, alkynylene, sulfur, oxygen, sulfone, silyl, and —$CH_2$—Z—$CH_2$— in which Z is a cyclic hydrocarbon group and R is selected from the group consisting of hydrogen, alkyl, nitro, nitroso, halogen, and cyano, and not more than two of the R groups for each phenyl group being other than hydrogen, a basic catalyst of ionic polymerization and an organic vicinal epoxide, and heating the glass materials while in juxtaposition to each other under such conditions to produce a solid polyisocyanurate polymer as defined in claim 1 and thereby bonding the glass materials together.

10. The process of claim 9 wherein the diisocyanate is 4,4'-diphenylmethane diisocyanate.

References Cited by the Examiner

UNITED STATES PATENTS

| | | | |
|---|---|---|---|
| 2,978,449 | 4/61 | France | 260—77.5 |
| 2,979,485 | 4/61 | Burkus | 260—77.5 |
| 3,075,979 | 1/63 | Tazuma | 260—77.5 |

OTHER REFERENCES

Lang: Handbook of Chemistry, 9th edition, p. 351, 1956.

LEON J. BERCOVITZ, *Primary Examiner.*